US005491515A

United States Patent [19]

Suzuki

[11] Patent Number: 5,491,515
[45] Date of Patent: Feb. 13, 1996

[54] IMAGE CODING/DECODING APPARATUS FOR EFFICIENT PROCESSING BY SHARING MEMBERS IN CODING/LOCAL DECODING AND DECODING PROCESSING

[75] Inventor: Mitsuyoshi Suzuki, Kamakura, Japan

[73] Assignee: Mitsubishi Denki Kabushiki Kaisha, Tokyo, Japan

[21] Appl. No.: 54,386

[22] Filed: Apr. 27, 1993

[30] Foreign Application Priority Data

Apr. 28, 1992 [JP] Japan .................................. 4-110402

[51] Int. Cl.$^6$ ..................................................... H04N 7/50
[52] U.S. Cl. .......................... 348/401; 348/384; 348/390; 348/403; 348/409
[58] Field of Search ..................................... 358/133, 135, 358/136; 379/53; 455/72, 84; 375/27, 122; 348/384, 390, 398, 400, 409, 410, 415, 401; H04W 7/133, 7/137

[56] References Cited

U.S. PATENT DOCUMENTS

| | | | |
|---|---|---|---|
| 4,707,738 | 11/1987 | Ferre ........................................ | 358/135 |
| 4,809,067 | 2/1989 | Kikuchi .................................... | 358/135 |
| 5,130,797 | 7/1992 | Murakami et al. ...................... | 358/133 |
| 5,164,980 | 11/1992 | Bush et al. .............................. | 379/53 |
| 5,202,760 | 4/1993 | Tourtier et al. ......................... | 358/133 |
| 5,253,078 | 10/1993 | Balkanski et al. ..................... | 358/135 |

OTHER PUBLICATIONS

Artieri, et al "A Chip Set Core for Image Compression" 1990 IEEE SGS–Thomson Microelectronics.
Technology Update, Video–Compression Chips "Monolithic Circuits Expedite Desktop Video" Electrical Design News Oct. 24, 1991.
1991 Symposium on VLSI Circuits Diget of Technical Papers May 30, 1991 Circuits Symposium.
IC Executes Still–Picture Compression Algorithms—Electronic Design May 23, 1991.
Proceedings of the IEEE 1991 Custom Integrated Circuits Conferenc May 12, 1991.
Purcell "The C–Cuibe CL550 JPEG Image Compression Processor" Comp–Con 91 Digest Of Papers.
Tamitani, et al "An Encoder/Decoder Chip Set for the MPEG Video Standard" ICASSP–92 D2EV Digital Signal Processing 2 Estimation.
InfoChip Systems Incorporated, Preliminary Information IC801 "Single Chip Px64 Codec For Video Phones".
"100 Mbit/s HDTV Transmission Using a High Efficienty Codec" by Y. Yashima & K. Sawada Signal Processing of HDTV II, 1990, pp. 579–586.

*Primary Examiner*—Tommy P. Chin
*Assistant Examiner*—Richard Lee
*Attorney, Agent, or Firm*—Wolf, Greenfield & Sacks

[57] ABSTRACT

An image coding/decoding apparatus intended for efficient processing by sharing members in coding, local decoding, and decoding processing. Processes such as DCT and IDCT, zigzag scan conversion and inversion, or quantization and inverse quantization performed in coding, local decoding, and decoding processing are similar to each other. DCT/IDCT, zigzag scan conversion/inversion, and quantization/inverse quantization are provided where either of the two functions can be selected for execution in synchronization with the processing timing for each block. Since the time required for one process for data for each block is very short, overall processing is not affected even if the members are used in a time division manner. By sharing processing, the hardware scale can be made small and by using a data bus in a time division manner, an external data bus can also be eliminated.

9 Claims, 7 Drawing Sheets

| CONVENTIONAL CONFIGURATION | | CONFIGURATION BY THE INVENTION | |
|---|---|---|---|
| MAIN COMPONENTS | NO. OF GATES (k GATES) | MAIN COMPONENTS | NO. OF GATES (k GATES) |
| MOTION DETECTION AND OPERATION MODE DECISION (4) | 15 | MOTION DETECTION AND OPERATION MODE DECISION (4) | 15 |
| FILTER (6) | 10 | FILTER (6) | 10 |
| FILTER (30) | 10 | | |
| FILTER (49) | 10 | | |
| INTERFRAME SUBTRACTION (8) | 1 | INTERFRAME SUBTRACTION (8) | 1 |
| INTERFRAME ADDITION (32) | 1 | INTERFRAME ADDITION (51) | 1 |
| INTERFRAME ADDITION (51) | 1 | | |
| DCT (10) | 25 | DCT/IDCT (105) | 27 |
| IDCT (25) | 25 | | |
| IDCT (43) | 25 | | |
| ZIGZAG SCAN CONVERSION (11) | 10 | ZIGZAG SCAN CONVERSION/ INVERSION (106) | 11 |
| ZIGZAG SCAN INVERSION (24) | 10 | | |
| ZIGZAG SCAN INVERSION (42) | 10 | | |
| QUANTIZATION (12) | 10 | QUANTIZATION/ INVERSE QUANTIZATION (107) | 15 |
| INVERSE QUANTIZATION (23) | 10 | | |
| INVERSE QUANTIZATION (41) | 10 | | |
| VLC·MUX (20) | 5 | VLC·MUX (20) | 5 |
| VLD·DMUX (37) | 5 | VLD·DMUX (37) | 5 |
| CODING CONTROL SECTION (16) | 5 | CODING CONTROL SECTION (16) | 5 |
| | | SEL (101) - (104) | 1 |
| SUM TOTAL | 198 | SUM TOTAL | 96 |

Fig. 5

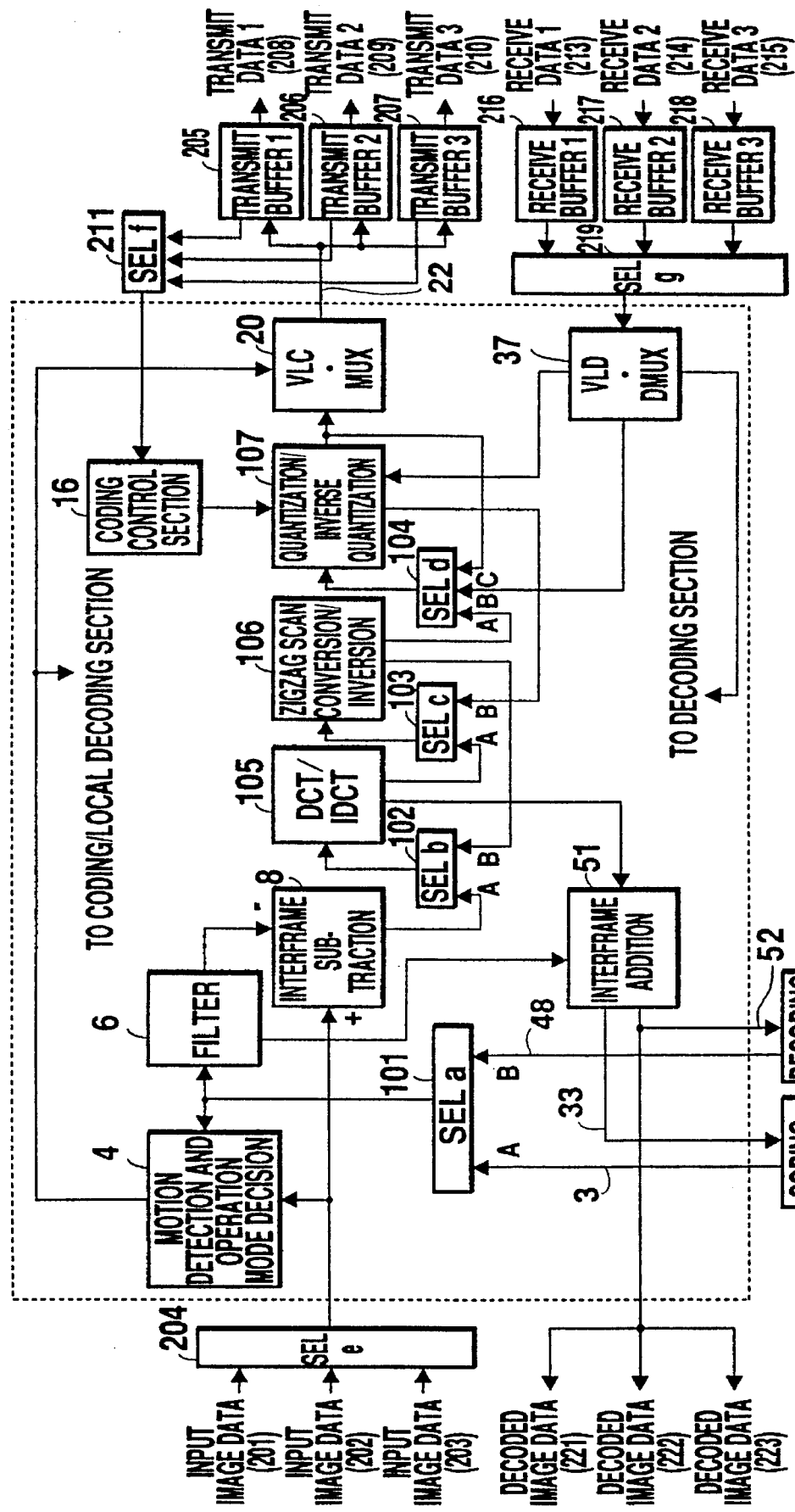

IMAGE CODING/DECODING APPARATUS FOR EFFICIENT PROCESSING BY SHARING MEMBERS IN CODING/LOCAL DECODING AND DECODING PROCESSING

BACKGROUND OF THE INVENTION

1. Field of the Invention

This invention relates to an image coding/decoding apparatus (hereinafter, the coding unit is called an encoder, the decoding unit is called a decoder, and the coding/decoding apparatus is called a CODEC).

2. Description of the Related Art

FIG. 1 is a block diagram of a conventional CODEC configured according to an algorithm conforming to image coding/encoding system recommendations H.261 on CCITT (International Telegraph and Telephone Consultative Committee) STUDY GROUP XV-REPORT R 3. In FIG. 1, numeral 1 is input image data, numeral 2 is a coding frame memory, numeral 3 is locally decoded image data of the immediately preceding frame, numeral 4 is motion detection and operation mode decision, numeral 5 is a coding motion vector and coding decision result, numeral 6 is a filter, numeral 7 is filter output data for coding, numeral 8 is interframe subtraction, numeral 9 is coding block image data, numeral 10 is DCT (discrete cosine transform), numeral 11 is zigzag scan conversion, numeral 12 is quantization, numeral 13 is a coding coefficient, numeral 14 is a coding zigzag scan coefficient, numeral 15 is a coding quantization index, numeral 16 is a coding control section, numeral 17 is a transmit buffer, numeral 18 is a transmit buffer parameter, numeral 19 is a coding step size, numeral 20 is VLC (variable length coding) and MUX (multiplex), and numeral 21 is coded compressed data, numeral 22 is transmit data, numeral 23 is inverse quantization, numeral 24 is zigzag scan inversion, numeral 25 is IDCT (inverse discrete cosine transform), numeral 26 is a local decode zigzag scan coefficient, numeral 27 is a local decode coefficient, numeral 28 is local decoding block image data, numeral 29 is locally decoded image data of the immediately preceding frame, numeral 30 is a filter, numeral 31 is filter output data for local decoding, numeral 32 is interframe addition, numeral 33 is locally decoded image data, numeral 34 is receive data, numeral 35 is a receive buffer, numeral 36 is compressed data to be decoded, numeral 37 is VLD (variable length decoding) and DMUX (demultiplex), numeral 38 is decode motion vector and decode decision result, numeral 39 is a decode step size, numeral 40 is a decoding quantization index, numeral 41 is inverse quantization, numeral 42 is zigzag scan inversion, numeral 43 is IDCT, numeral 44 is a decode zigzag scan coefficient, numeral 45 is decode coefficient data, numeral 46 is decoding block image data, numeral 47 is a decoding frame memory, numeral 48 is decoded image data of the immediately preceding frame, numeral 49 is a filter, numeral 50 is filter output data for decoding, numeral 51 is interframe addition, and numeral 52 is decoded image data.

The operation of the conventional CODEC will now be described.

In FIG. 1, image data for 1-frame (for example, 352 horizontal picture elements×288 vertical picture elements) is divided into coding/decoding processing blocks (for example, 16 horizontal picture elements×16 vertical picture elements) for processing for each block. The encoder performs coding processing and local decoding processing (which is a part of the coding processing, but is distinguished from it in the description of the operation) for each block and the decoder performs decoding processing for each block. The encoder and decoder operate independently of each other.

Coding processing of encoder:

The input image data 1, which is data for each block, and the locally decoded image data of the immediately preceding frame 3, read from the coding frame memory 2, are supplied to the motion detection and operation mode decision 4 which then compares both the image data 1 and the image data 3 for motion detection and operation mode decision. The operation mode decision is to determine which of INTRA (intraframe coding) and INTER (interframe coding) is to be performed and whether the filter 6 is to be turned ON or OFF depending on the comparison result. The function of motion detection is to detect a motion vector indicating motion of the corresponding blocks between frames. The sections of the encoder are controlled in response to the detected coding motion vector and coding decision result 5.

When the operation mode is judged to be INTER, interframe subtraction 8 is performed between the input image data 1 and the filter data for coding 7 provided by passing the locally decoded image data 3 for the corresponding block of the immediately preceding frame whose motion is compensated through the filter 6; when the operation mode is judged to be INTRA, the locally decoded image data of the immediately preceding frame 3 is set to 0, thereby outputting the input image data 1 through the subtractor 8 to provide the coding block image data 9 to be coded.

DCT (discrete cosine transform) 10, zigzag scan conversion 11, and quantization 12 are performed in sequence for the coding block image data to provide the coding coefficient 13, coding zigzag scan coefficient 14, and coding quantization index 15 respectively. The quantization 12 uses the coding step size determined based on transmit buffer parameters 18 such as the generated information amount and remainder of the transmit buffer 17 at the coding control section 16.

The coded compressed data 21 provided by performing VLC (variable length coding) and MUX (multiplex) 20 for the transmit data of the coding motion vector and coding decision result 5, coding quantization index 15, and coding step size 19 is stored in the transmit buffer 17. Then, the transmit data 22 is sent conforming to the line transmission speed (bit rate).

Local decoding processing of encoder:

For interframe coding, the encoder must have the same immediately preceding frame image as the decoder. The data of the immediately preceding frame must also be restored from receive data to perform decoding processing from receive data only at the receiving unit and interframe coding based on the same data must also be performed at the transmitting unit. Thus, the same local decoding processing as the decoder is performed for coded data.

The coding quantization index 15 is subjected to inverse quantization 23 by using the same coding step size 19 as coding, and is further subjected to zigzag scan inversion 24 and IDCT (inverse discrete cosine transform) 25 to provide the local decode zigzag scan coefficient 26, local decode coefficient 27, and local decode block image data 28 respectively.

The local decode image data of the immediately preceding frame 29 is again read from the coding frame memory. Interframe addition 32 is performed between the filter data for local decoding 31 provided by passing the image data 29 through the filter 30 and the local decode block image data 28 and the local decode image data 33 (data restored from the coded data) is written into the coding frame memory 2.

Decoding processing of decoder:

The receive data 34 from the line is stored in the receive buffer 35 is and then read out as the compressed data to be decoded 36 at the timing conforming to decoding processing.

The compressed data to be decoded 36 is subjected to variable length decoding and demultiplexing at the VLD (variable length decoding) and DMUX (demultiplex) 37 to provide the decode motion vector and decode decision result 38, decode step size 39, and decode quantization index 40. The decode motion vector and decode decision result 38 are used to control the sections of the decoder.

The decode quantization index 40 is subjected to inverse quantization 41 by using the decode step size 39 and further subjected to zigzag scan inversion 42 and IDCT 43 to provide the decode zigzag scan coefficient 44, decoding coefficient 45, and decoding block image data 46 respectively.

The decoded image data of the immediately preceding frame 48 is read from the decoding frame memory 47. Interframe addition 51 is performed between the filter data for decoding 50 provided by passing the image data 48 through the filter 49 and the decoding block image data 46. The resultant decoded image data 52 is written into the decoding frame memory 2 and is output as a decoded image at the same time.

The conventional image CODEC has the encoder and decoder which operate independently, and contains a plurality of similar components. This introduces such problems that (1) the circuit scale is large and expensive;

(2) the gate scale and wiring area are too large to put the circuitry into an LSI and external pins cannot be multiplexed and the number of external pins increases, thus it is difficult to house the circuitry in one chip; and (3) when a large number of images are coded/decoded at the same time, there is no synchronous relationship to enable multiplex between the images, thus multiplexing cannot be performed and the same number of devices must be provided as the number of images to be processed.

SUMMARY OF THE INVENTION

Accordingly, it is an object of the invention to provide an image CODEC having a small and inexpensive circuit scale which can be put into a 1-chip LSI and can code/decode a large number of images at the same time without any additional devices. To this end, according to the invention, there is provided an image coding/decoding apparatus which performs time-division processing by using an encoder and decoder for synchronizing for each time of image block processing and by using a selector for switching identical or similar functions related to coding and local decoding processing performed by the encoder, and decoding processing performed by the decoder. The identical or similar functions are DCT and IDCT, zigzag scan conversion and zigzag scan inversion, quantization and inverse quantization, or the like, any of which can be selected for processing by slightly changing the circuit configuration. Parallel processing of a plurality of image signals is also performed in a timing division manner.

The image CODEC uses a member which provides two or more identical or similar functions with a selector for switching input/output data. Therefore, if there are two or more identical or similar processing functions, the second and later components can be eliminated. Further, because of time-division processing, a single data bus can be used to transfer data between a plurality of functions and the LSI wiring length and the number of external pins can be reduced. Further, coding and decoding processing can be multiplexed by controlling time-division processing for each time of image block processing. A plurality of image processes can be performed in a time division manner for further raising efficiency.

BRIEF DESCRIPTION OF THE DRAWINGS

In the accompanying drawings:

FIG. 5 is a table showing gate scale comparison between the conventional configuration and the configuration according to the invention;

FIG. 6 is a block diagram showing a multiscreen simultaneous coding/decoding apparatus using the configuration according to the invention.

DESCRIPTION OF THE PREFERRED EMBODIMENTS

Referring now to the accompanying drawings, there are shown embodiments of the invention.

Embodiment 1

Figure 1:
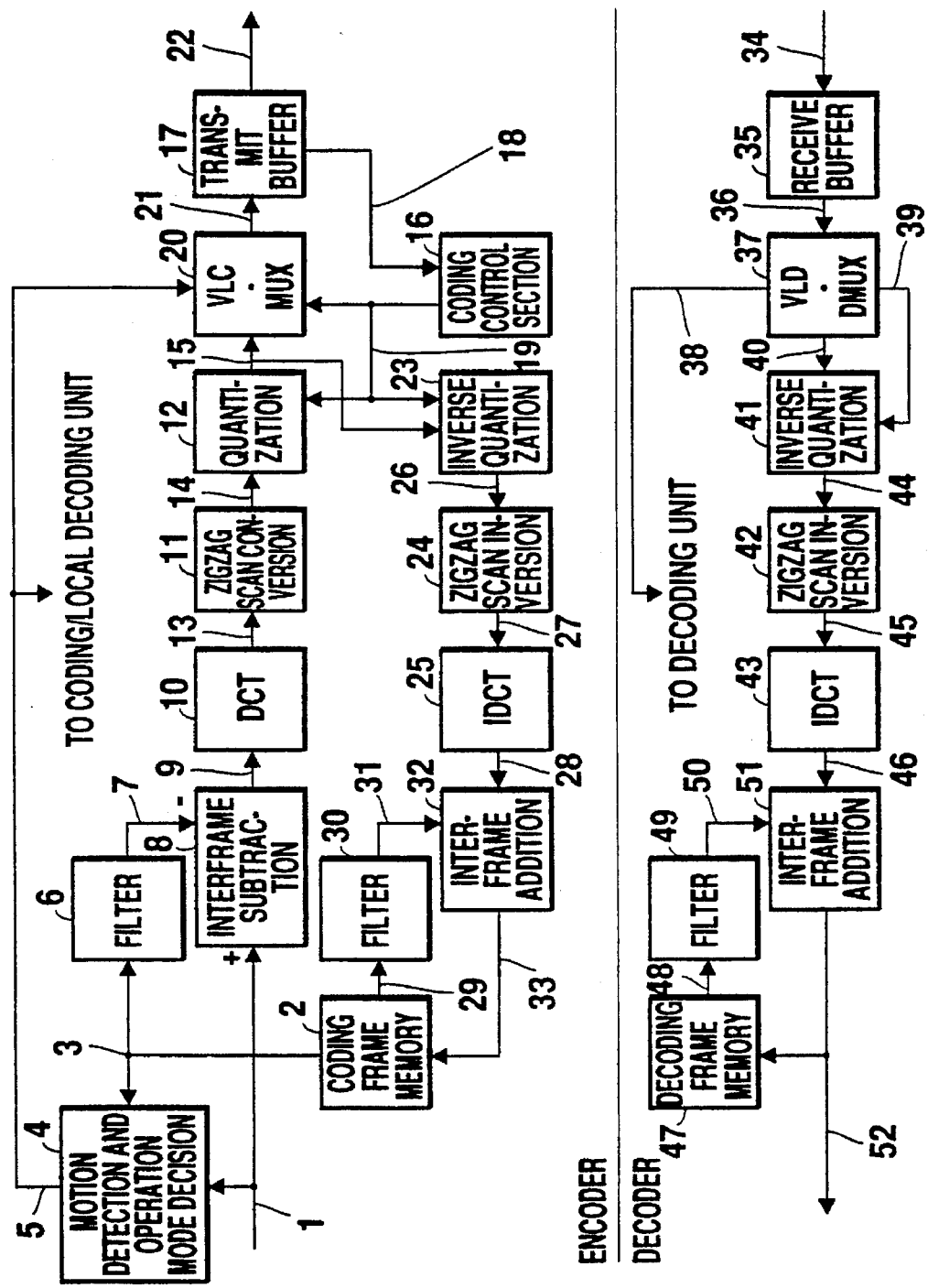
FIG. 1 is a block diagram of a conventional image CODEC.
Figure 2:
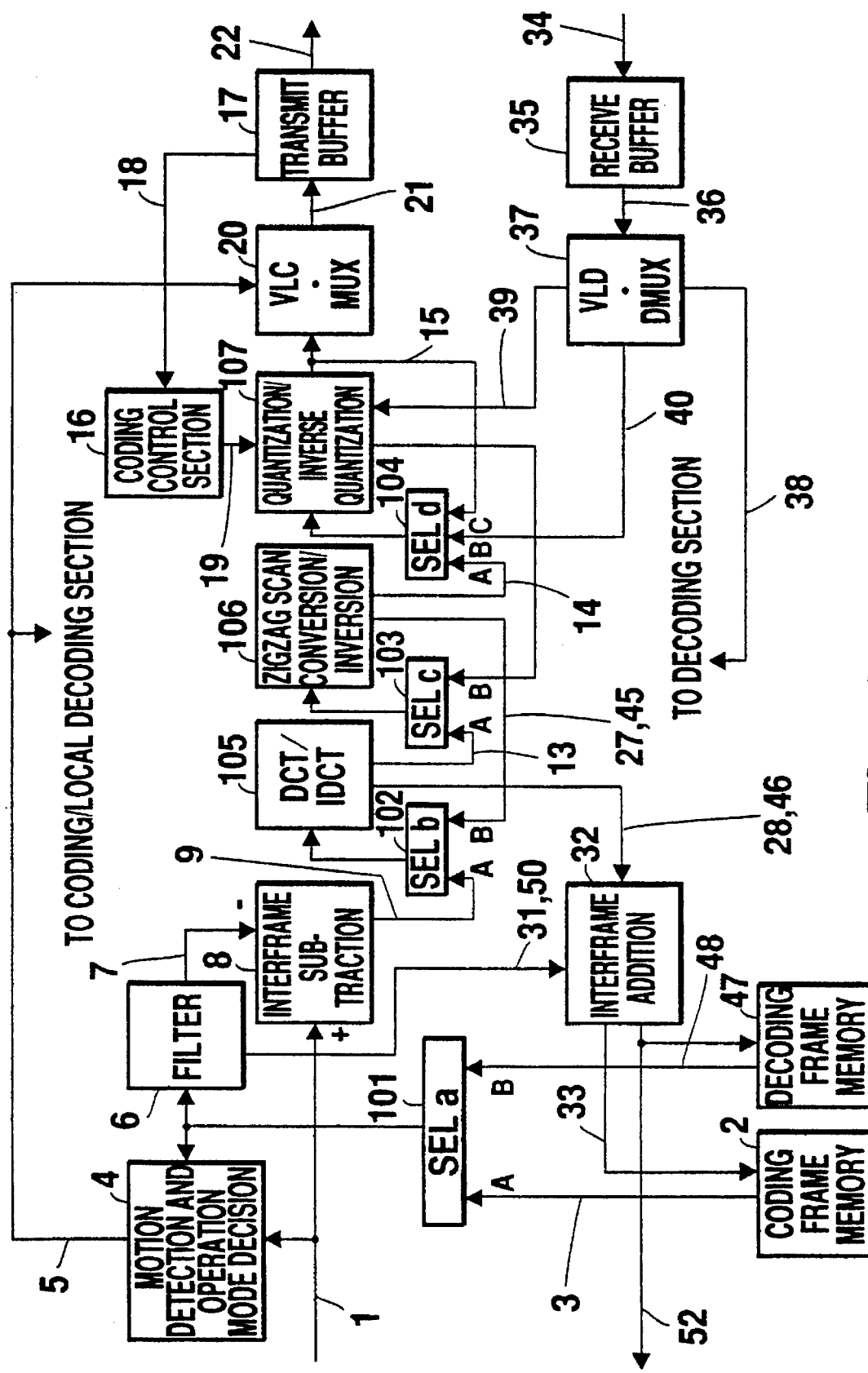
FIG. 2 is a block diagram of an image CODEC according to the invention.

FIG. 2 is a block diagram showing one example of the configuration of an image CODEC according to the invention, wherein numeral 101 is a selector SELa, numeral 102 is a selector SELb, numeral 103 is a selector SELc, numeral 104 is a selector SELd, numeral 105 is DCT/IDCT, numeral 106 is zigzag scan conversion/inversion, and numeral 107 is quantization/inverse quantization. The same or equivalent parts to those shown in FIG. 1 are designated by the same reference numerals in FIG. 2, and will therefore not be discussed again.

The operation of the image CODEC will now be described.

In FIG. 2, as with the conventional image CODEC, 1-frame of image data is divided into coding/decoding processing blocks prior to coding processing and local decoding processing by the encoder, and decoding processing by the decoder, for each block; each of the processes operates in a time division manner in a time slot synchronized for each block.

Coding processing of encoder:

In time slots for coding processing by the encoder, four selectors SELa 101, SELb 102, SELc 103, and SELd 104 are all set to the A selection mode. The DCT/IDCT 105 is set to the DCT mode, the zigzag scan conversion/inversion 106 to the zigzag scan conversion mode, and the quantization/inverse quantization 107 to the quantization mode for processing. The operation of the encoder is identical with "coding processing of encoder" described for the conventional image CODEC, and will therefore not be discussed again. That is, by setting the particulars modes, the DCT/IDCT 105, zigzag scan conversion/inversion 106, and quantization/inverse quantization 107 serve similar functions to the DCT 10, zigzag scan conversion 11, and quantization 12 of the conventional image CODEC.

Local decoding processing of encoder:

In time slots for local decoding processing of the encoder, four selectors SELa 101, SELb 102, SELc 103, and SELd 104 are set to the A, B, B, and C selection modes respectively. The DCT/IDCT 105 is set to the IDCT mode, the zigzag scan conversion/inversion 106 to the zigzag scan inversion mode, and the quantization/inverse quantization 107 to the inverse quantization mode for processing. The operation of the decoder is identical with "local decoding processing of encoder" described for the conventional image CODEC, and will therefore not be discussed again. That is, by setting the particulars modes, the filter 6, DCT/IDCT 105, zigzag scan conversion/inversion 106, and quantization/inverse quantization 107 serve similar functions to the filter 30, IDCT 25, zigzag scan inversion 24, and inverse quantization 23, respectively of the conventional image CODEC.

Decoding processing of decoder:

In time slots for the decoding processing of the encoder, four selectors SELa 101, SELb 102, SELc 103, and SELd 104 are all set to the B selection mode. The DCT/IDCT 105 is set to the IDCT mode, the zigzag scan conversion/inversion 106 to the zigzag scan inversion mode, and the quantization/inverse quantization 107 to the inverse quantization mode for processing. The operation of the encoder is identical with "decoding processing of encoder" described for the conventional image CODEC, and will therefore not be discussed again. That is, by setting to particular modes, the filter 6, DCT/IDCT 105, zigzag scan conversion/inversion 106, quantization/inverse quantization 107, and interframe addition 32 serve as similar functions to the filter 49, IDCT 43, zigzag scan inversion 42, inverse quantization 41, and interframe addition 51, respectively, of the conventional image CODEC.

Figure 3:
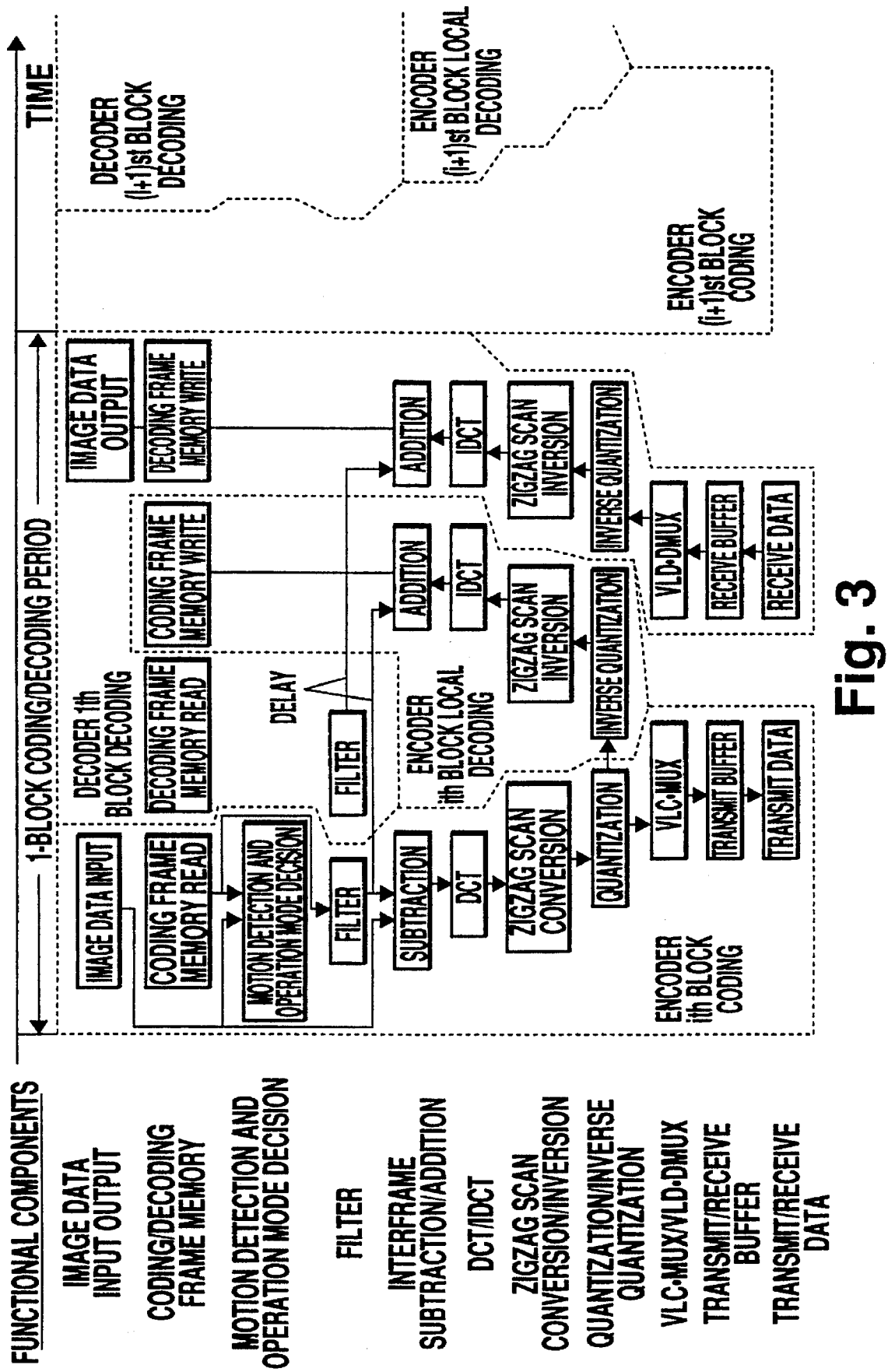
FIG. 3 is an operation timing chart of image coding/decoding processing according to the invention.

FIG. 3 is an example of an operation timing chart of image coding/decoding processing according to the invention, wherein the time and functional components are shown on the horizontal and vertical axes respectively.

Within the 1-block coding/decoding period, encoder ith block coding and local decoding and decoder lth block decoding (i and l are image block numbers of the encoder and decoder and are independent of each other) are performed in given time slots (shown by broken lines). In the next period, the encoder and decoder perform processing the next block. These steps are repeated to complete coding/decoding processing of one image frame.

In the 1-block coding/decoding processing, pipeline processing involving processing delays of the functional components is performed, and the functional components of the filter, DCT/IDCT, zigzag scan conversion/inversion, and quantization/inverse quantization are used twice or three times for coding, local decoding, and decoding. That is, the filter 6 is used twice for coding and decoding and the DCT/IDCT 105, zigzag scan conversion/inversion 106, and quantization/inverse quantization 107 are used three times for coding, local decoding, and decoding. Other functional components, the coding frame memory 2 and decoding frame memory 47, the interframe subtraction 8 and interframe addition 32, the VLC MUX 20 and VLD DMUX 37, and the transmit buffer 17 and receive buffer 35 are separated, but may be united as a coding/decoding frame memory, an interframe subtraction/addition, a VLC MUX and VLD DMUX, and a transmit/receive buffer respectively for time-division processing. Mode switching in SELa to SELd and function switching in the members may be performed as with normal time-division processing, example, then may be controlled by a CPU (central processing unit), and registers may be located at necessary places to enable data to be held for the predetermined time.

Embodiment 2

Figure 4:
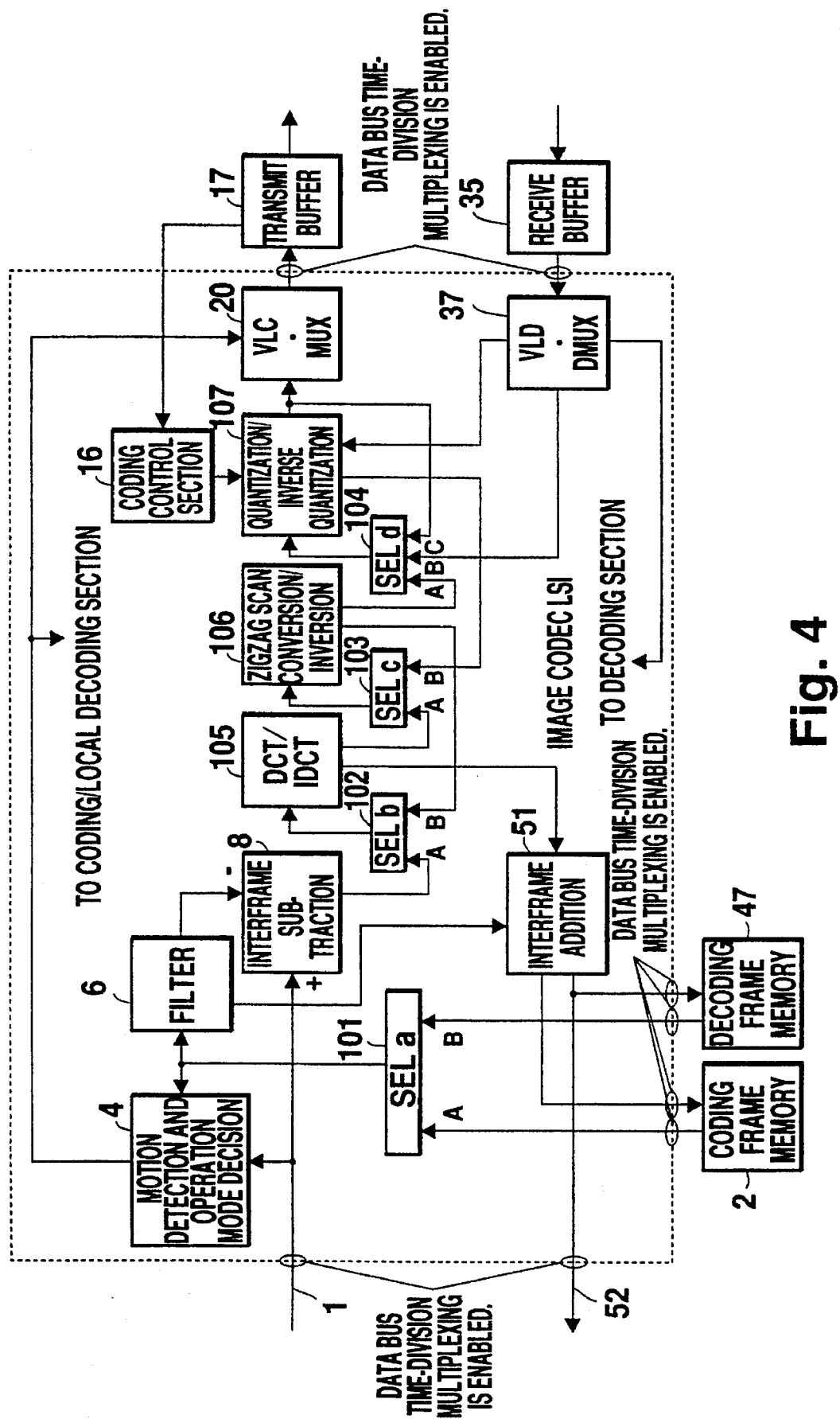
FIG. 4 is a block diagram showing an image CODEC LSI according to the invention.

FIG. 4 is a block diagram showing an example of an image CODEC LSI according to the invention which is the same in configuration and operation, and will therefore not be discussed again. In the example, the blocks surrounded by the broken line are housed in a 1-chip LSI.

As shown in FIG. 3, image data input and output, coding frame memory read and write and decoding frame memory read and write, VLC MUX operation and VLD DMUX operation, and transmit buffer operation and receive buffer operation are executed in separate time slots. Thus, each of a data bus for input image data 1 and decoded image data 52 (image output side), a data bus for locally decoded image data 33 and decoded image data 52 (decoding frame memory side), and a data bus for coded compressed data 21 and decoded compressed data 36 can also be configured for sharing in a time division manner, thereby reducing the number of LSI external pins by half. Therefore, it becomes very easy to install the circuitry on a single chip.

FIG. 5 shows gate scale comparison between the conventional configuration and the configuration according to the invention. As shown here, the sum total of gates of main components of the conventional circuitry shown in Figure is reduced to a half or less by using the configuration according to the invention; the conventional configuration whose gate scale is too large to put into a 1-chip LSI can be put into a 1-chip LSI. For the conventional configuration that can be put into a 1-chip LSI, the LSI cost can be lowered by reducing the gate scale.

Embodiment 3

FIG. 6 is a block diagram showing an example of a multiscreen simultaneous coding/decoding apparatus using the configuration according to the invention, wherein the blocks surrounded by the broken line are the same as the corresponding blocks shown in FIG. 2 in operation, and will therefore not be discussed again. The components outside the broken line box are described.

In FIG. 6, numeral 201 is first input image data, numeral 202 is second input image data, numeral 203 is third input image data, numeral 204 is a selector SELe, numeral 205 is a first transmit buffer, numeral 206 is a second transmit buffer, numeral 207 is a third transmit buffer, numeral 208 is first transmit data, numeral 209 is second transmit data, numeral 210 is third transmit data, numeral 211 is a selector SELf, numeral 213 is first receive data, numeral 214 is second receive data, numeral 215 is third receive data, numeral 216 is a first receive buffer, numeral 217 is a second receive buffer, numeral 218 is a third receive buffer, numeral 219 is a selector SELg, numeral 221 is first decoded image data, numeral 222 is second decoded image data, and numeral 223 is third decoded image data.

The operation of the coding/decoding apparatus will now be described.

For simplicity of explanation, the number of screens for simultaneous coding/decoding is three for coding and three for decoding, but any number of screens may be handled.

Time-division time slots for processing three screens for coding are assigned to encoders 1 to 3 and time-division time slots for processing three screens for decoding are assigned to decoders 1 to 3.

During the period of the time slot of the encoder 1 for one image block, the first input image data 201 is selected among the first input image data 201, second input image data 202, and third input image data 203 by the selector SELe 204 for coding and local decoding. Likewise, the second input image data 202 is selected in the time slot of the encoder 2 and the third input image data 203 is selected in the time slot of the encoder 3 for coding and local decoding. The locally decoded image data of the immediately preceding frame 33 corresponding thereto is used. Transmit data 22 provided by coding is stored in the first transmit buffer 205, second transmit buffer 206, and third transmit buffer 207 for sending as the first transmit data 208, second transmit data 209, and third transmit data 210. Transmit buffer parameters are selected by the selector SELf 211 for each time slot for use by the coding control section 16. The locally decoded image data 33 is written into the coding frame memory 2.

The first receive data 213, second receive data 214, and third receive data 215 are stored in the first receive buffer 216, second receive buffer 217, and third receive buffer 218 respectively, and are then selected by the selector SELg 219 during the periods of the time slots of the decoders 1 to 3 respectively for decoding. At that time, the decoded image data of the immediately preceding frame 48 corresponding thereto is used. Decoded image data 52 is written into decoding frame memory 47 and at the same time, are output as the first decoded image data 221, second decoded image data 222, and third decoded image data 223.

Figure 7:
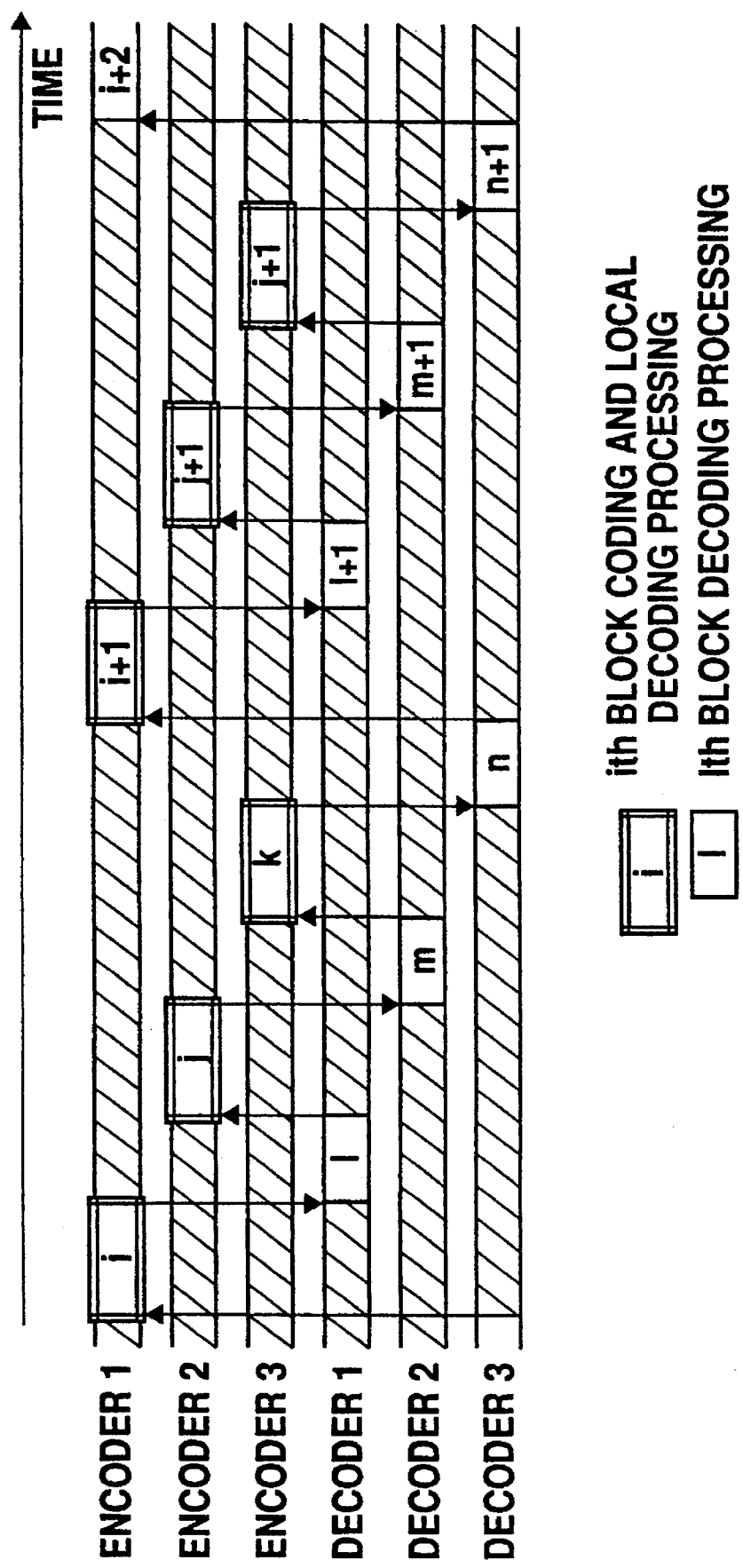
FIG. 7 is an operation timing chart of image coding/decoding processing using the configuration according to the invention.

FIG. 7 is an operation timing chart of image coding/decoding processing using the configuration according to the invention. Time-division processing is performed in the following order: ith block coding and local decoding processing by the encoder 1, lth block decoding processing by the decoder 1, jth block coding and local decoding processing by the encoder 2, mth block decoding processing by the decoder 2, kth block coding and local decoding processing by the encoder 3, nth block decoding processing by the decoder 3, (i+1)st block coding and local decoding processing by the encoder 1, (l+1)st block decoding processing by the decoder 1, . . . (i, j, k, l, m, and n are independent of each other) for blocks of one image frame, thereby coding three image frames and decoding three image frames simultaneously.

Since the processing time required for 1-block data at each member has been greatly shortened due to highly functional LSIs, etc., it is possible to perform time-division data processing.

According to the invention, image coding processing and decoding processing are synchronized for each image block processing timing and identical or similar processing functions are used in a time division manner for coding processing and decoding processing, thereby reducing the image CODEC scale to a half or a third of the scale of the conventional image CODEC, which enables drastic miniaturization of the apparatus.

Further, according to the invention, time-division multiplexing of a single data bus is enabled and the number of picture element pins of the LSI is reduced for putting the circuitry into a 1-chip LSI.

Further, according to the invention, an apparatus which can code and decode a large number of images simultaneously can be provided without any additional devices.

What is claimed is:

1. An image coding/decoding apparatus comprising:

a first selector for receiving a locally decoded image signal of a preceding time frame and a decoded image signal for a preceding time frame, for selecting between the received signals and for outputting a first selected signal;

a filter for receiving the first selected signal and for outputting a filtered signal;

an interframe subtractor for receiving the filtered signal and an input image signal and for outputting an interframe subtracted signal;

a second selector for receiving the interframe subtracted signal and a zig-zag scan inverted signal, for selecting one of the interframe subtracted signal and the zig-zag signal and for outputting a second selected signal;

a discrete/inverse discrete cosine transformer for receiving the second selected signal, for transforming the second selected signal and for outputting a transformed signal;

a third selector for receiving the transformed signal and an inverse quantized signal and for outputting a third selected signal;

a zig-zag scan converter/inverter for receiving the third selected signal, for converting the third selected signal and for outputting the converted signal;

a receive buffer for receiving coded compressed data signals, for storing the coded compressed data signals and for outputting the coded compressed data signals;

a variable length decoder and demultiplexer for receiving the coded compressed data signals, for decoding and demultiplexing the coded compressed data signals and for outputting decoded and demultiplexed data signals;

a fourth selector for receiving the converted signal, the decoded and demultiplexed data signals and an inverse quantized signal and for outputting a fourth selected signal;

a quantizer/inverse quantizer for receiving the fourth selected signal, for quantizing the fourth selected signal and for outputting a quantized signal;

a variable length coder and multiplexer for receiving a coding motion vector signal and the quantized signal, for coding and compressing the received coding motion vector and quantized signals and for outputting the coded compressed signals;

a transmit buffer for receiving the coded compressed data signals for storing the coded compressed data signals and for outputting the coded compressed data signals;

an interframe adder for receiving an inverse transformed signal and the filtered signal and for outputting an added decoded image signal;

a decoding frame memory for receiving the added decoded image signal, for storing the decoded image signal and for outputting the decoded image signal.

2. An image coding/decoding apparatus as claimed in claim 1, wherein the apparatus performs coding processing of the input image signal during a time slot synchronized for such processing by selecting the locally decoded image signal input to the first selector, the interframe subtracted signal input to the second selector, the transformed signal input to the third selector and the converted signal input to the fourth selector.

3. An image coding/decoding apparatus as claimed in claim 1, wherein the apparatus performs decoding processing of the received coded compressed data during a time slot synchronized for such processing by selecting the decoded image signal input to the first selector, the zig-zag scan inverted signal input to the second selector, the inverse quantized signal input to the third selector and the decoded and demultiplexed data signal input to the fourth selector.

4. An image coding/decoding apparatus as claimed in claim 1, wherein the apparatus performs a local decoding of coded data during a time slot synchronized for such processing by selecting the locally decoded image signal input to the first selector, the zig-zag scan inverted signal input to the second selector, the inverse quantized signal input to the third selector and the inverse quantized signal input to the fourth selector.

5. An image coding/decoding apparatus as claimed in claim 1, wherein mode switching of the selectors is controlled by a central processing unit.

6. The image input image signal coding/decoding apparatus as claimed in claim 1, wherein the input image signal reception, the locally decoded image signal read from the coding frame memory, the decoded image signal read from the decoding frame memory, the variable length coding and compressing, the decoded image signal output, the decoding frame memory store, the variable length decoding and demultiplexing, the transmit buffer store and the receive buffer store are all performed during separate individual time slots.

7. The image coding/decoding apparatus as claimed in claim 1, wherein the image coding/decoding apparatus further comprises:

an input image data selector for selecting from a plurality of parallel input image data signals and for outputting a selected input image data signal;

the transmit buffer includes a plurality of transmit buffers for receiving a plurality of coded compressed signals in parallel, for storing the coded compressed signals and for outputting the coded compressed signals, and a transmit buffer selector for receiving the output coded compressed signals, for selecting one of the plurality of coded compressed signals and for outputting a selected coded compressed signal;

the receive buffer includes a plurality of receive buffers for receiving a plurality of coded compressed data signals in parallel, storing the coded compressed data signals and outputting the coded compressed data signals, and a receive buffer selector for receiving the coded compressed data signals, for selecting one of the plurality of coded compressed data signals and for outputting a selected coded compressed data signal.

8. The image coding/decoding apparatus as claimed in claim 1, wherein the apparatus is manufactured on a single LSI chip excluding the transmit and receive buffers, and the coding and decoding frame memories.

9. The image coding/decoding apparatus as claimed in claim 8, wherein a single data bus is utilized for inputting the input image signal, the decoded image signal and the locally decoded image signal, and for outputting the coded compressed data signal and the decoded image signals in a time division multiplexed manner.

* * * * *